(No Model.)
C. W. BEHRENS.
HAY RACK.
No. 502,220. Patented July 25, 1893.
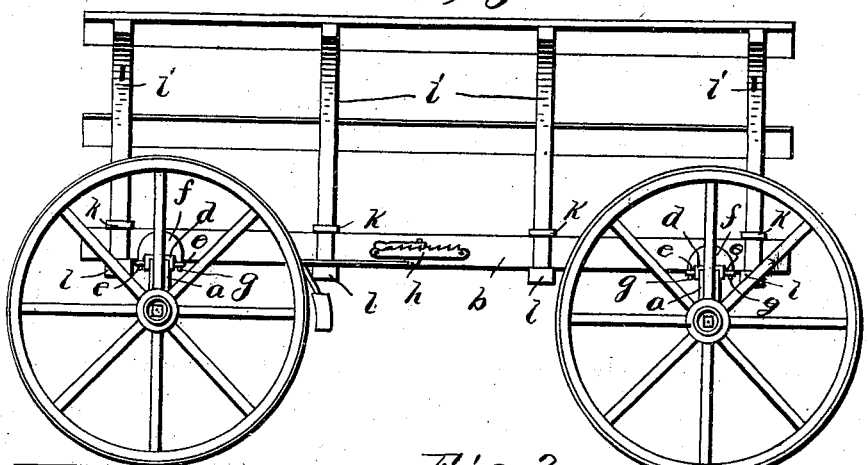
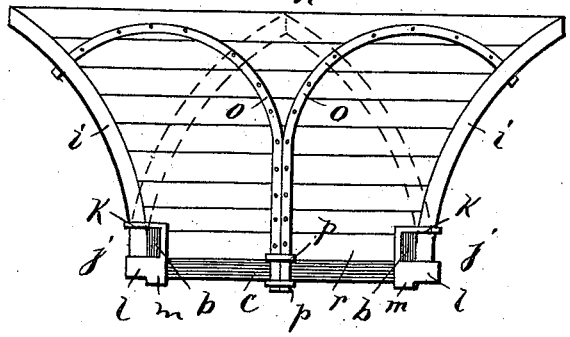
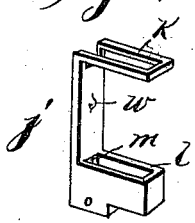
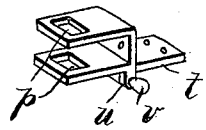
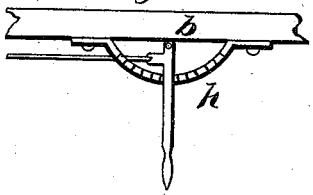
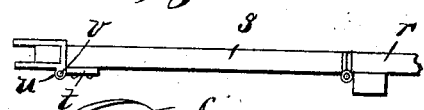
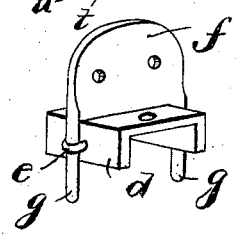
WITNESSES:
C. M. Werlé
E. C. Duffy
INVENTOR
Chas. W. Behrens
BY O. E. Duff
ATTORNEY.

UNITED STATES PATENT OFFICE.

CHARLES W. BEHRENS, OF LANCASTER, OHIO.

HAY-RACK.

SPECIFICATION forming part of Letters Patent No. 502,220, dated July 25, 1893.

Application filed September 26, 1892. Serial No. 446,938. (No model.)

*To all whom it may concern:*

Be it known that I, CHARLES W. BEHRENS, of Lancaster, in the county of Fairfield and State of Ohio, have invented certain new and useful Improvements in Hay-Racks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in hay racks.

The object of the invention is to provide an improved hay rack exceedingly cheap, simple and durable in construction and composed of a minimum number of parts, and which can be easily handled and operated and will be light in weight and yet exceedingly strong.

A further object of the invention is to provide a hay rack having improved means for detachably securing the same to the running gear of a wagon so that the hay rack can be easily exchanged for a wagon body.

A further object of the invention is to provide an improved hay rack so constructed and arranged in an improved manner as to be easily knocked down and separated so that the parts thereof can be packed together or hung up or stored in a barn or other building.

A further object of the invention is to provide a hay rack having end gates and improved ways and means of securing the end gates.

A further object of the invention is to provide a hay rack having a floor so constructed and arranged in an improved manner that corn or other materials can be drawn through the floor in small quantities until the bulk in the rack is sufficiently reduced to permit the removal of an end gate without the contents falling out in great quantity.

The invention consists in certain novel features of construction and in combinations of parts more fully described hereinafter and particularly pointed out in the claims.

Referring to the accompanying drawings, Figure 1, is a side elevation of the hay rack mounted on a running gear. Fig. 2 is an end view of the hay rack without the running gear. Fig. 3, is a detail plan view of a portion of a side beam of the rack showing the brake operating means attached thereto. Fig. 4, is a detail perspective view of one of the clips securing the side and cross beams and uprights of the sides. Fig. 5, is a detail perspective view of the means for securing the hay rack to the running gear. Fig. 6, is a detail side or edge view of the floor showing the drop therein. Fig. 7, is a detail perspective view showing the catch for holding said drop and the end clip to which the end gate is fitted.

In the drawings the reference letter $a$, indicates the running gear of a wagon or other vehicle and is of any suitable or desirable construction.

$b, b$, indicate the longitudinal side beams of the hay rack, and $c$, indicates the cross beams thereof, shown as being four in number although of course any desirable number can be employed. Suitable angle plates $d$, are secured on the ends of the bolsters with rigid eyes $e$, on the sides thereof. Plates $f$, are secured to the sides of the side beams of the rack, and each is provided with two or more downwardly extending pins $g, g$, so arranged that when the rack is on the running gear the lower edges of the vertical plates $ff$, secured on said side beams will rest on the plates secured on the bolsters and the pins $g, g$, will straddle, or extend down each side of said angle plates $d, d$, and enter the eyes $e, e$, and thereby rigidly hold the rack to the running gear, yet in such a manner that the rack can be easily lifted from the running gear whenever desired and the wagon body substituted in place thereof.

$h$, indicates any suitable brake lock and operating mechanism secured to the outer side of one of the side beams of the rack.

The sides of the rack are composed of the uprights $i$, curved as shown, and the longitudinal slats secured on said uprights. The uprights on opposite sides are curved in opposite directions to form the sides outwardly flaring when the rack is employed to carry hay or the like and so as to close together at the top, as shown by dotted lines in Fig. 2, when the sides are reversed to form an inclosure of the rack for carrying sheep, hogs, &c.

The parts of the rack are removably secured together by the clips $j$, each composed of a plate or body fitting the inner side or edge of a side beam, a slotted or looped end $k$, extending horizontally across and beyond the upper edge of said beam, and the socket $l$, extending horizontally from the lower end of said body or plate across and beyond the lower edge of the beam. An equal number of uprights $i$ and cross beams $c$, are employed and the uprights $i$, are located in the same vertical planes as their respective cross beams as illustrated. The lower end of each upright $i$, passes down through the loop $k$, and into the socket $l$, of its respective clip, thereby forcing the upright against the outer side of the side beam. The inner side of each clip just below the side beam is also provided with a socket $m$, into which the end of the cross beam fits. When the parts are forced home in their respective sockets they are rigidly held and forced against the side beams, and yet so that they can be easily withdrawn and the rack knocked down or separated. The clips can be made in any suitable manner and of any suitable material, as by casting or welding each clip integral.

$n$, indicates the end gates. Each gate consists of cross slats suitably secured to the bars or metal rods $o, o$, having their lower vertical portions located together and projecting below the lower slat and their upper portions extending laterally in opposite directions and projecting down and laterally from opposite sides or edges of the gate. Hence when the gate is placed in position said lower ends extend down into a clip or socket $p$, secured to the center of the end cross bar, and the upper projecting ends extend into slots or sockets in the upper inner portions of the end uprights $i, i$, of the sides. The end gates are thus held most securely and yet can be easily detached at any time, and furthermore they brace and strengthen the sides against strain.

The device can be easily converted from a hay rack to form an inclosure by removing the end gates and then lifting out each side and reversing it so that the two sides curve in toward each other and meet at the top, and then replacing the end gates.

When the rack is used for carrying corn or the like a floor $r$, is employed having a drop $s$, at one or both ends. Each drop is hinged at one end (see Fig. 6) and at the other edge is provided with the tongue $t$, perforated at the outer end and adapted to register with perforated ears $u, u$, on the rear end of the clip $p$, so that a pin $v$, can be inserted through said perforations and uphold the drop. Thus when the rack is filled with corn or other like material the drop can be lowered and the corn discharged into sacks or the like until the bulk in the rack is sufficiently reduced to permit the removal of an end gate so that the corn can be scooped from the rack.

If desired each cross beam and set of uprights can be provided with sockets so that the end gates can be located at any point in the rack and hence loads of various amounts can be carried.

When the rack is not being used it can be knocked down and the parts thereof hung up or stored in a barn or other building where they will be dry and unexposed.

The end clips can be employed to receive the posts to which the boom pole is attached, when the end gates are removed and the rack loaded with hay.

The inner face of the body of each side clip is provided with a stud or projection $w$, to enter the side beam and hold the same.

The many advantages and great utility of this invention are obvious.

It is evident that various changes might be made in the forms, constructions and arrangements of the parts described without departing from the spirit and scope of my invention; hence I do not wish to limit myself to the precise arrangement and construction herein shown and set forth.

Having thus fully described my invention, what I claim as new, and desire to secure by Letters Patent of the United States, is—

1. The hay rack having its bottom frame provided with side clips, the sides removably fitted therein, the end clips secured to the end cross beams, and the end gates composed of the metal bars as described, having slats secured thereto and joined at their lower ends to fit said end sockets.

2. A hay rack comprising the cross and side beams, the reversible and correspondingly curved sides, and an end gate composed of cross bars secured to uprights or bars which project below and from the sides of the gate to removably fit in sockets in the end cross beam and sides of the rack, substantially as described.

3. A hay rack having cross and side beams, the side frames, an end gate, a socket secured to an end cross bar to retain the end gate, said socket having perforated ears, the floor having a drop, said drop having a perforated plate to register with said ears and be held by a pin, substantially as described.

4. The combination of a running gear, the U shaped plates on the bolster thereof having the eyes on the sides thereof, a hay rack having the plates secured to the sides thereof to rest on the U shaped plates and having pins to enter said eyes, substantially as described.

In testimony that I claim the foregoing as my own I affix my signature in presence of two witnesses.

CHARLES W. BEHRENS.

Witnesses:
HUBERT E. PECK,
C. M. WERLÉ.